Patented Feb. 7, 1950

2,496,271

UNITED STATES PATENT OFFICE 2,496,271

ALLYL ESTERS OF CYCLOHEXYL SUBSTITUTED SUCCINIC ACIDS

Jack Andrews Cottrell, Donald Helmsley Hewitt, and Frank Armitage, Homerton, London, England; Ernest Booth and Richard Hartlebury Buckle, both of London, England, executors of said Hewitt, deceased, assignors, by mesne assignments to The Sherwin-Williams Company, Cleveland, Ohio, a corporation of Ohio No Drawing. Application April 13, 1946, Serial No. 662,096. In Great Britain April 17, 1945

4 Claims. (Cl. 260—468)

This invention is for improvements in or relating to the production of polymerisable esters and has for an object to provide a process for the production of esters which are capable of conversion by the application of heat to the insoluble, infusible state.

It is well known that many aliphatic unsaturated alcohols, such as the allyl and methallyl alcohols, will react with mono-basic organic acids to yield esters capable of polymerisation to form thermo-plastic polymers. It is also well known that the esters of such alcohols with polybasic acids are capable of being converted to the insoluble, infusible state on heating. Of the polybasic acids which have already been described, there are the dibasic acids of the succinic acid series, the inorganic polybasic acids, such as silicic and phosphoric acids, the acids derived from amphoteric inorganic oxides such as alumina and the unsaturated polycarboxylic acids such as maleic acid; the esters of such alcohols with the unsaturated mono-carboxylic acids, such as acrylic acid and cinnamic acid are also known to be convertible to the insoluble infusible state on heating.

According to the present invention, there is provided a process for the manufacture of a polymerisable ester which comprises esterifying, with allyl or methallyl alcohol, the Diels-Alder reaction product of maleic anhydride with an organic compound containing at least two conjugated pairs of doubly-linked carbon atoms; it will be understood that in referring to methallyl alcohol we mean β-methyl allyl alcohol. It will be appreciated that the conjugated pairs of doubly-linked carbon atoms with which the invention is concerned do not include the double bonds of benzene and those of its simple alkyl substitution products which, so far as is known, do not undergo the Diels-Alder reaction with maleic anhydride. The substituted succinic acids produced by the high temperature reaction between maleic anhydride and the alkyl-substituted aromatic hydrocarbons (which is believed to involve a mobile hydrogen atom) fall within the scope of our co-pending application No. 9580/45. Among the organic compounds which may be reacted with maleic anhydride to form the Diels-Alder adduct are the conjugated terpenes, e. g. α-terpinene, the conjugated cyclo-aliphatic poly-enes, e. g. cyclo-pentadiene, anthracene, aromatic compounds having an unsaturated aliphatic side-chain such as iso-saffrole (Hudson and Robinson, Journal of the Chemical Society 1941, pages 715 to 722), α-methylstyrene (Tomayo and Viguero, Annales fís quím 1942, volume 38 pages 184 to 191), aromatic compounds containing non-aromatic unsaturation in a ring fused to an aromatic ring, such as coumarone and indene (American Chemical Abstracts 1940, column 2953, Abstract of Tyutyunnikov Coke and Chemistry (U. S. S. R.) 1939, volume 9, No. 1, pages 31 and 32) and the conjugated drying oil fatty acids and esters thereof.

The invention also includes a modification of the process hereinbefore described according to which an alcoholysis reaction is effected between a lower alkyl ester of the said Diels-Alder adduct and the allyl or methallyl alcohol, whereby there is produced the polymerisable ester required.

The Diels-Alder addition products of maleic anhydride with conjugated unsaturated organic compounds, such as elaeostearic acid or its esters, cyclo-pentadiene and certain conjugated terpenes are well known and the esterification of such Diels-Alder adducts with poly-hydric alcohols to produce resins is also well known.

The following examples illustrate the manner in which the invention may be carried into effect:

*Example 1.*—Commercial di-pentene was fractionated and the fraction boiling at 180° to 182° C. and comprising primarily α-terpinene, was collected.

200 grams of the α-terpinene were then mixed with 70 grams of maleic anhydride.

The mixture was then heated under reflux at a temperature of 100° to 110° C. for 3 hours in the presence of 1 gram of benzoyl peroxide; at the end of the period of 3 hours the temperature was slowly raised to a temperature of 160° C., during the succeeding 3 hours, and thereafter the clear liquid product was distilled under vacuum to remove excess unreacted reagent.

The undistilled residue was a treacly oil which, when heated with glycerine, gelled thus demonstrating that the product contains poly-carboxylic products.

50 grams of the undistilled residue were mixed with 60 grams of allyl alcohol, 2 grams of para-toluene sulphonic acid and 100 grams of xylene. The reaction mixture was boiled and the water of esterification distilled off. After the conclusion of the esterification reaction, the xylene solution was washed with dilute aqueous caustic soda and the oil layer was subjected to a vacuum distillation. After the xylene had been distilled away a fraction boiling at about 200° C. under a pressure of 6 mms. distilled over in the form of a heavy oil leaving behind a residue which resembled a soft balsam. The heavy oil distillate was polymerised by heating with a ½% by weight thereof of benzoyl peroxide at a temperature of 120° to 140° C. and produced a hard tough resin which was thermo-plastic; the fact that the resin was thermo-plastic appears to indicate that the molecule contained only 1 allyl residue.

The residue from the distillate was similarly polymerised by heating in the presence of ½% by weight of benzoyl peroxide at a temperature of 120° to 140° C. and this produced a hard, brittle resin which was infusible and insoluble, thus showing that the soft balsam residue was a thermo-hardening product containing a plurality of allyl residues in the molecule.

It will be understood that instead of distilling the reaction mixture, after having removed the xylene, to separate it into the oily and balsamic fractions, the whole of the products remaining after removal of the xylene could be polymerised by heating with benzoyl peroxide as above described to produce an infusible insoluble resin, that is to say, that the mixture of the oil and the balsamic residue is capable of thermo-hardening.

*Example 2.*—Pure cyclopentadiene was prepared from a 70% crude sample of the dimer, by depolymerisation and fractionation. 242 gms. of powdered maleic anhydride was suspended in dry benzene, and 163 gms. of the pure cyclopentadiene added thereto in small portions, the vessel being cooled during the additions. After leaving to stand overnight, a yield of 350 gms. of white crystals, was filtered off.

350 gms. of the adduct thus prepared was mixed with 1200 gms. of allyl alcohol and 3 gms. of p-toluene sulphonic acid and the mixture was refluxed for 8 hours until the acid value had reached 52.6. Most of the unreacted alcohol was then distilled off and was replaced by an equal quantity of fresh allyl alcohol, and the reaction continued for a further 3 hours. The bulk of the alcohol was again distilled off and the residue poured into water. The ester layer was now taken up in ether and washed with a 10% by weight aqueous sodium carbonate solution to remove free acids. After removing the ether the ester distilled at 160°/170° C. at ⅘ mm. mercury, as a water white liquid.

In the presence of benzoyl peroxide the allyl ester polymerised at 125° C. to a clear, rather brittle solid in 4 to 5 hours.

*Example 3.*—A mixture of pure anthracene (54 g.), freshly distilled maleic anhydride (29 g.) and anhydrous xylene (280 ccs.) was refluxed for 6 hours. The adduct separated out as the reaction proceeded, and at the end was filtered off, washed with benzene and dried at 100° C. It could be recrystallised from xylene or acetic anhydride, separating from either solvent in small, hard prisms, M. Pt. 250° to 251° C. (with decomposition).

A mixture of the crude adduct (30 g.), allyl alcohol (100 g.) and concentrated sulphuric acid (5 g.) were boiled under reflux for 5 hours and then poured into water. The precipitated oily ester was taken up in ether and freed from allyl alcohol and acids by several successive washings, first with water, and then with a cold, saturated aqueous solution of sodium carbonate. The ethereal solution was dried over anhydrous sodium sulphate, and, on removal of the solvent, a light brown viscous oil was recovered which had an acid value of 2.3, yield, 35 g.

The oil was then fractionated in vacuo. A little anthracene and diallyl maleate first came over (these are formed by fission of the adduct during esterification; a thing quite frequently observed); the required ester, diallyl 1:4 endo-o-phenylene - 1:2:3:4-tetrahydronaphthalene-2:3-dicarboxylic ester, then came over at 230° to 234° at 2.5 mms. as a light yellow oil which solidified in the receiver to a crystalline solid.

The allyl ester (5 g.) was fused with 0.1 g. of benzoyl peroxide (2% by weight of the ester) and the melt was poured into a flat dish and maintained in an oven at 120° C. for 18 hours; polymerisation to a rather brittle resin took place. The resin is thermoplastic, it softens at 50°–60° C. and melts completely below 120° C. It cures, however, on continued polymerisation to a thermo-hardened product.

*Example 4.*—A mixture of wood oil fatty acids (28 g.), freshly distilled maleic anhydride (10 g.) and anhydrous benzene (25 ccs.) was refluxed for 8 hours and then allowed to cool. Allyl alcohol (1000 ccs.) concentrated sulphuric acid (5 ccs.) and decolourising charcoal (1 g.) were then added, and the whole refluxed for a further 8 hours and then filtered hot. The filtrate was diluted with an equal volume of ether and freed from allyl alcohol and acids by several successive agitations, first with water, and then with a cold, saturated aqueous solution of sodium carbonate. The ether-benzene solution was dried over anhydrous sodium sulphate, and the solvents were removed, leaving the triallyl esters as a brown, viscous oil, having an acid value of 3.2, yield, 40 g.

The ester (5 g.) was mixed with 0.1 g. of benzoyl peroxide and kept in a flash dish at 120° C. for 18 hours. It slowly polymerised to a tough, rubbery resin not softened by heat.

The nature of the products of the present invention may vary from oils to soft resins of the character of balsams.

The products of the present invention are particularly suitable for use in the surface-coating field since, by a suitable choice of the conjugated unsaturated organic compound, the products may have a viscosity which is sufficiently low to allow them to be used, in the absence of solvents, as coating compositions and impregnating compositions and similarly the volatility may be controlled so that the polymerisable ester does not boil or evolve a substantial quantity of vapours at the temperature of polymerisation. The products are also particularly suitable as bonding agents, owing to the fact that they are convertible to the insoluble, infusible state on heating.

The products of the present invention, therefore, can be used in bonding compositions, electrical insulating compounds, varnish compositions, surface-coating compositions and the invention includes such compositions particularly those containing no solvent.

The invention also includes fabricated products such as brake linings or plywood, in which the bonding agent is a polymerisable ester produced in accordance with the present invention.

The invention also includes a method of producing an insulated electrical conductor which comprises impregnating a coil, cable or the like with a selected polymerisable ester produced in accordance with the present invention and thereafter subjecting the impregnated electrical conductor to the action of heat whereby the said polymerisable ester is thermo-hardened.

Polymerisation catalysts, such as benzoyl peroxide, are generally necessary in the polymerisation of the esters of this invention.

What we claim is:

1. A monomeric polymerizable ester of an alcohol of the class consisting of allyl and methallyl alcohols and a Diels-Alder condensation compound of the type obtained by reacting a compound of the class consisting of maleic acid, maleic anhydride and lower alkyl esters of maleic acid and a conjugated monocyclic terpene.

2. A monomeric polymerizable ester as claimed in claim 1 wherein the conjugated terpene is $\alpha$-terpinene.

3. A monomeric polymerizable ester as claimed in claim 1 wherein the alcohol is allyl alcohol.

4. A monomeric polymerizable ester of allyl alcohol and the Diels-Alder condensation compound obtained by reacting maleic anhydride with $\alpha$-terpinene.

JACK ANDREWS COTTRELL.
DONALD HELMSLEY HEWITT.
FRANK ARMITAGE.

REFERENCES CITED

The following references are of record in the file of this patent:

UNITED STATES PATENTS

| Number | Name | Date |
|---|---|---|
| 2,067,054 | Humphrey | Jan. 5, 1937 |
| 2,262,002 | Hopff et al. | Nov. 11, 1941 |
| 2,275,034 | Moyle | Mar. 3, 1942 |
| 2,280,256 | Patterson | Apr. 21, 1942 |
| 2,311,259 | Staff et al. | Feb. 16, 1943 |
| 2,346,612 | Rothrock | Apr. 11, 1944 |
| 2,359,038 | Hopff et al. | Sept. 26, 1944 |
| 2,389,379 | McCulloch | Nov. 20, 1945 |
| 2,445,627 | Morris et al. | July 20, 1948 |

OTHER REFERENCES

Bachmann et al., "Jour. Am. Chem. Soc.," vol. 60 (1938), pp. 481–485.

Ardashev et al., "Chem. Abstracts," vol. 34 (1940), page 5205.

Morrell et al., "Chem. Abstracts," vol. 37 (1943), page 6143.

Blagonravova et al., "Chem. Abstracts," vol. 38 (1944), page 4142.